United States Patent [19]

Priem et al.

[11] Patent Number: 5,764,861
[45] Date of Patent: Jun. 9, 1998

[54] APPARATUS AND METHOD FOR CONTROLLING CONTEXT OF INPUT/OUTPUT DEVICES IN A COMPUTER SYSTEM

[75] Inventors: Curtis Priem, Fremont; David S. H. Rosenthal, Palo Alto, both of Calif.

[73] Assignee: Nvidia Corporation, Sunnyvale, Calif.

[21] Appl. No.: 784,017

[22] Filed: Jan. 15, 1997

Related U.S. Application Data

[62] Division of Ser. No. 441,045, May 15, 1995, Pat. No. 5,659,750.

[51] Int. Cl.[6] .................................................. G06F 9/46
[52] U.S. Cl. .................................................. 395/678
[58] Field of Search ........................... 395/670–678, 395/651–653, 200.1, 284, 497.01, 828–834, 369

[56] References Cited

U.S. PATENT DOCUMENTS

| | | | |
|---|---|---|---|
| 5,127,098 | 6/1992 | Rosenthal et al. | 395/412 |
| 5,142,677 | 8/1992 | Ehlig et al. | 395/678 |
| 5,367,680 | 11/1994 | Flurry et al. | 395/677 |
| 5,371,849 | 12/1994 | Peaslee et al. | 395/501 |
| 5,421,014 | 5/1995 | Bucher | 395/670 |
| 5,455,958 | 10/1995 | Flurry et al. | 395/800 |
| 5,479,626 | 12/1995 | Bindloss et al. | 395/421.02 |

*Primary Examiner*—Lance Leonard Barry
*Attorney, Agent, or Firm*—Stephen L. King

[57] ABSTRACT

Hardware input/output control apparatus for use in a computer system which control apparatus is joined to a plurality of input/output devices, and includes circuitry which responds to commands from unprivileged application programs addressed to input/output devices joined to the hardware input/output apparatus for selecting a context to be placed on an addressed input/output device to function with an application program sending the command.

18 Claims, 6 Drawing Sheets

APPARATUS AND METHOD FOR CONTROLLING CONTEXT OF INPUT/ OUTPUT DEVICES IN A COMPUTER SYSTEM

This application is a division of application Ser. No. 08/441,045, filed May 15, 1995, now U.S. Pat. No. 5,659,750.

BACKGROUND OF THE INVENTION

1. Field of the Invention

This invention relates to computer systems, and more particularly, to the control of context on input/output devices in a new input/output architecture for computer systems.

2. History of the Prior Art

In the 1960s, International Business Machines (IBM) and Control Data Corporation (CDC) produced mainframe computers with architectures in which a central processing unit (CPU) controlled program manipulation and separate input/ output processors (called channel processors or peripheral processor units) controlled input/output operations. The input/output processors had instruction sets which allowed them to carry out the somewhat limited functions designated by commands placed in memory by the central processing unit. For example, the input/output processors knew how to access data on disk and place data on an output display. This form of architecture made, and in some cases still makes, a great deal of sense. At that time, central processing units were very expensive; and using the central processing unit to accomplish input/output operations was very wasteful. Neither the CDC nor the IBM input/output processors were as powerful as the central processing unit and thus could be produced relatively inexpensively. These architectures allowed individual computers to be built to emphasize operations by the central processing unit or operations by the input/output devices. By building a faster central processing unit, the main processing functions could be made to go faster; while by building faster input/output processors, the input/output operations could be accelerated.

As an example of this type of operation, in the IBM system, the central processing unit would signal which input/output operation it desired by writing channel commands to main memory and signaling a channel processor that there was something for it to do. The channel processor would read those commands and proceed to execute them without aid from the central processing unit. If an input/ output processor was instructed to do something, it would do it. As long as the operation was safe, there was no problem. Unfortunately, if the operation was something prohibited like reformatting the hard disk which contained the basic operating system, the input/output processor would also do that.

These architectures were designed to allow programs to time share (multi-task) the central processing unit. With an operating system which allows multi-tasking, it is necessary to protect the resources allotted to one application program from operations conducted by other application programs so that, for example, one program cannot write to memory over the space utilized by another program. An important part of this protection is accomplished by keeping application programs from writing directly to portions of the system where they might cause harm such as main memory or the input/ output devices. Since the input/output processors would do whatever they were instructed in the IBM and CDC systems, it was necessary to limit access to these input/output processors to trusted code, generally operating system code and device drivers, in order to preclude application programs from undertaking operations which would interfere with other application programs or issuing commands which would wreak havoc with the system. Apart from any other problems, writing directly to the input/output devices creates a security problem in a multi-tasking system because the ability to write to and read from input/output devices such as the frame buffer means an application program may read what other programs have written to the device. For these reasons, both the IBM and CDC architectures kept any but privileged operating system code from writing to operating system memory and to the input/output devices.

In 1971, the Digital Equipment Corporation (DEC) PDP11 computer appeared. In the original embodiment of this architecture, all of the components of the computer are joined to a system backplane bus. The central processing unit and any other component of the computer (except main memory) addresses each other component as though it were an address in memory. The addresses for the various hardware components including input/output devices simply occupy a special part of the memory address space. Only the address itself indicates that a component is a device such as an input/output device which is other than memory. When the central processing unit wants to accomplish an input/ output operation, it simply writes or reads addresses assigned to the particular input/output device in memory address space. This architecture allows all of the operations available to the central processing unit to be utilized in accomplishing input/output operations and is, therefore, quite powerful. Moreover, this allows the input/output operations to be accomplished without the need for special commands or for special resources such as input/output processors. It also allows the use of very simple input/output controllers which typically amount to no more than a few registers.

As with the earlier IBM and CDC architectures and for the same reasons, writing to the input/output devices directly by other than trusted code is prohibited by the PDP11 operating systems. The PDP11 architecture provides a perfect arrangement for handling this. This architecture, like some of its predecessors, incorporates a memory management unit designed to be used by an operating system to allow the addressing of virtual memory. Virtual memory addressing provides access to much greater amounts of memory than are available in main memory by assigning virtual addresses to data wherever it may be stored and translating those virtual addresses to physical addresses when the data is actually accessed. Since operating systems use memory management units to intercept virtual addresses used by the central processing unit in order to accomplish the virtual-to-physical address translation, operating systems may simply provide no virtual-to-physical translations of any input/ output addresses in the memory management unit for application programs. Without a mapping in the memory management unit to the physical addresses of input/output devices, the application program is required to use a trusted intermediary such as a device driver in order to operate on an input/output device in the PDP11 architecture.

Thus, in a typical computer system based on the PDP11 architecture, only trusted code running on the central processing unit addresses input/output devices. Although this architecture allows all of the facilities of the central processing unit to be used for input/output, it requires that the operating system running on the central processing unit attend to all of the input/output functions. Requiring a trap into the system software in order to accomplish any input/ output operation slows the operation of the computer.

Moreover, in contrast to earlier systems, in this architecture, there is no process by which the input/output performance of the system can be increased except by increasing the speed of the central processing unit or the input/output bus. This is an especial problem for programs which make heavy use of input output/devices. Video and game programs which manipulate graphics extensively and make extensive use of sound suffer greatly from the lack of input/output speed.

This problem is especially severe because when only trusted code can access input/output devices, then all accesses must be through this trusted code. That means that each operation involving input/output devices must go through a software process provided by the operating system and the input/output device drivers. The manner in which this is implemented is that when an application program is running on the central processing unit, the addresses it is allowed to access are mapped into the memory management unit by the operating system. None of these addresses may include input/output addresses. When an application program desires to accomplish an input/output operation, it executes a subroutine call into the operating system library code. This subroutine performs an explicit trap into the operating system kernel. As a part of the trap, the operating system changes the memory management unit to create mappings to the device registers. The operating system kernel translates the virtual name used for the input/output device by the application program into the name of a device driver. The operating system kernel does a permission check to ensure that the application is permitted to perform this operation. If the application is permitted to perform the operation, the operating system kernel calls the device driver for the particular input/output resource. The input/output device driver actually writes the command for the operation to the registers of the input/output hardware which are now mapped by the memory management unit. The input/output device responds to the command by conducting the commanded operation and then generates signals which indicate whether the operation has succeeded or failed. The input/output device generates an interrupt to the device driver to announce completion of the operation. The device driver reads the signals in the registers of the input/output device and reports to the operating system the success or failure of the operation. Then the operating system returns from the trap with the success or failure indication, restores the mappings for the application and thus removes the mappings for the device registers, and ultimately returns from the subroutine call reporting the success or failure of the operation to the unprivileged code of the application.

This sequence of steps must take place on each operation conducted using input/output resources. The process is inordinately long, and a recitation of the steps involved illustrates why applications using graphics or other input/output devices extensively cannot be run at any real speed on such systems.

This problem has been made worse by the tendency of hardware manufacturers to bias their systems in favor of write operations to the detriment of read operations. This bias has gradually increased as processors have become faster (the only way to accelerate a system having the PDP11 architecture) while bus speed has tended to lag requiring that write operations on the bus be buffered. The interface in this type of architecture (including Intel X86 type systems) between input/output devices and the input/output bus includes a plurality of registers to which the central processing unit may write and which the central processing unit may read. Since write operations are buffered, all write commands in the write buffer queues must be processed through the buffers before any read can proceed. And during a read operation, the central processing system cannot conduct other operations since it must typically remain on the input/output bus in order to read synchronously the data being transferred. In some systems, some read operations take as much as twenty times as long as write operations.

Since the operating system running on the central processing unit must handle all of the reads and writes to input/output devices in this architecture, the central processing unit is further slowed by this hardware bias when dealing with input/output intensive applications. For example, manipulating graphic images typically requires extensive read/modify/write operations. Many application programs which make extensive use of input/output devices, including a great number of games, are unable to function with architectures which require that the operating system read and write to the output devices on behalf of the applications. In order to obtain the speed necessary to display their operations satisfactorily such programs must read and write to the input/output devices directly. This has always been allowed by the Microsoft DOS operating system but by none of the advanced operating systems such as Unix. Ultimately, with extensive urging by the windows system developers, the operating system designers of workstation operating systems have grudgingly allowed applications to read and write to the graphics circuitry directly by mapping some of the physical addresses which the input/output devices decode to their memory address space. This allows windows system developers to read and write to the graphics hardware directly even though the security and integrity of the system is compromised by so doing. There have also been multitasking system which have allowed application programs to write directly to the graphics hardware. However, these systems have required that the operation be accomplished using the operating system software to trap input/output accesses and accomplish context switching to assure that application programs do not interfere with one another; consequently, the result is significantly slower than desirable.

For all of these reasons, many games simply avoid multitasking operating systems such as windows systems. In general, games must be operated in single tasking systems such as Microsoft DOS which allows an unlimited form of writing directly to the input/output devices while sacrificing the integrity of the system.

It is very desirable to provide a new architecture which allows input/output operations to proceed at a faster speed so that application programs which make significant use of the input/output components may function in the advanced multi-tasking operating systems without sacrificing system integrity.

Another major problem has surfaced with computers running multi-tasking operating systems. In a computer system, different application programs must have access to the different input/output devices of the system. In order for an application program to run with an input/output device, various registers of the input/output device should hold values which control the operation of the device. For example, certain registers of a graphics control circuit are typically filled with values which indicate in some manner the values which are to be used by the graphics control device in its color lookup tables. Similarly, other registers hold other values needed for the operation of a graphics controller and other input/output devices with each application program. Typically, these values and other values which must be changed for operation of a particular input/output device with a particular application program are referred to as the "context" of that application for that input/output device.

Different application programs provide different context values for the registers of input/output devices and thus require different context on the input/output device in order to function most effectively. In certain cases, the same application program will place different context on an input/output device in order to accomplish different specific operations with the device. In computer systems and especially in multi-tasking systems where different application programs run on the same processor in interleaved operations, it is necessary in order for each application program to make most effective use of the input/output devices to switch the context of various input/output devices whenever a new application has access to the input/output device. Often it is also desirable to switch the context on an input/output device when, though the same application program is accessing the input/output device, the use of the device has changed.

Prior art multi-tasking systems have devised various ways of handling this problem. One advanced technique described in U.S. Pat. No. 5,127,098 requires that a system memory management unit provide a valid mapping for a single application program at a time to a single address space of the input/output device. Whenever a different application is to use the input/output device, the system traps the attempt, interrupts the operation, saves the present context, provides a new mapping to the memory management unit for the new application program, provides new context to the input/output device for the application program, and restarts the system so that the new application may access the device.

A problem with this method is that the operating system must be called to change the context for each different application. This is quite slow and drastically delays the operation of a multi-tasking system which is constantly switching between application programs.

It is desirable to provide apparatus and a method for rapidly switching context in a computer system.

SUMMARY OF THE INVENTION

It is, therefore, an object of the present invention to provide apparatus and a method for rapidly switching context for input/output devices in a computer running a multi-tasking operating system.

It is another object of the present invention to provide circuit arrangements for switching context on an input/output device when different application programs utilize the same input/output devices in multi-tasking operating systems.

It is yet another object to provide circuit arrangements for switching context when an application program utilizes the same input/output devices for different purposes.

These and other objects of the present invention are realized in an arrangement which provides hardware input/output control apparatus for use in a computer system which control apparatus is joined to a plurality of input/output devices, and includes circuitry which responds to commands from unprivileged application programs addressed to input/output devices joined to the hardware input/output apparatus for selecting a context to be placed on an addressed input/output device to function with an application program sending the command.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
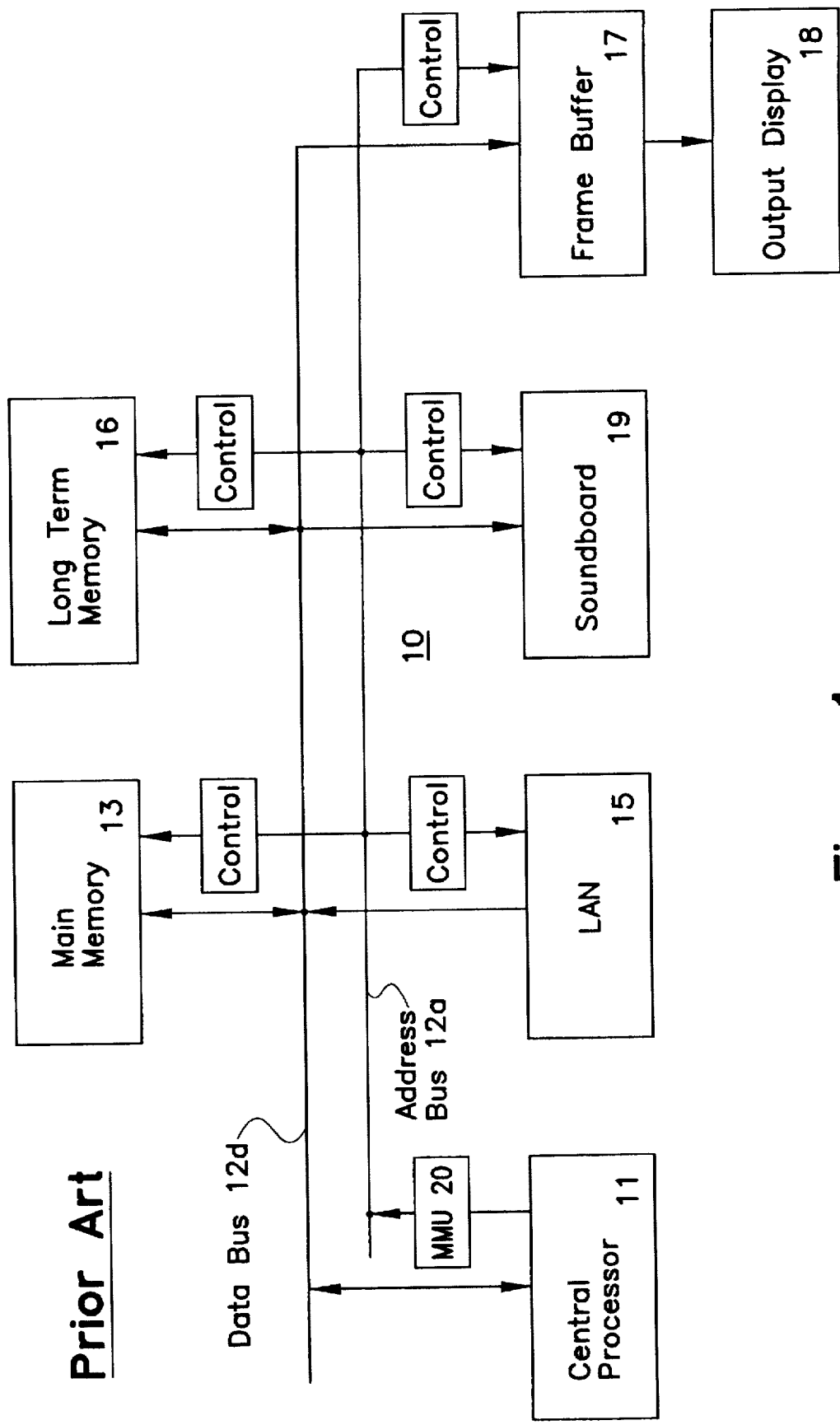
FIG. 1 is a block diagram of a prior art computer system.

Referring now to FIG. 1, there is illustrated a computer system 10 constructed in accordance with the prior art based on the architecture of a DEC PDP11 computer. The system 10 includes a central processing unit 11 which executes the various instructions provided to control the operations of the system 10. The central processing unit 11 is joined to a bus 12 adapted to carry information between the various components of the system 10. The bus 12 is separated in the figure into address bus 12a and data bus 12d, but both will be referred to as the bus 12 unless the context requires otherwise. Joined to the bus 12 is main memory 13 which is typically constructed of dynamic random access memory arranged in a manner well known to those skilled in the prior art to store information during a period in which power is provided to the system 10. In more advanced systems based on this architecture, the main memory 13 may be positioned on a bus more closely associated with the central processing unit 11 so that operations between the central processing unit 11 and main memory need not occupy the bus 12 and may be carried on more rapidly. In any case, the bus 12 may be treated as essentially an input/output bus.

Connected to the bus 12 are various peripheral components such as long term memory 16, a frame buffer 17 to which data may be written which is to be transferred to a device such as a monitor 18 for display, a sound board 19, and a local area network (LAN) 15. Each of these peripheral components is an input/output device to which data must be written and from which data must be read only by the central processing unit using trusted code associated with the operating system. Typically, each of these peripheral components includes a set of registers to which this trusted operating system code may write and from which the trusted code may read in order to accomplish these operations.

Associated with the central processing unit 11 and the address bus 12a is a hardware memory management unit 20. The memory management unit 20 typically includes circuitry for accomplishing a translation of virtual addresses to physical addresses. This allows an application program running on the central processing unit 11 to address memory or an input/output device using a virtual address. The virtual address is translated by the memory management unit 20 into a physical address using page tables in main memory through which a lookup is accomplished. The physical address is then placed on the address bus 12a where it may be detected by one of a number of controllers each associated with one of the input/output devices on the bus 12. The device to which the command is addressed may then respond to the command placed on the data bus 12d.

The memory management unit 20 usually includes an address cache such as a lookaside buffer in which recently used virtual addresses and their associated physical addresses are stored. The address cache provides very rapid translation for recently accessed addresses and eliminates the time consuming page table lookups in main memory for a great proportion of memory address translations.

In the system of FIG. 1, an application program requiring access to a device on the input/output bus sends a subroutine call to the operating system library code requesting the operating system to do the operation on its behalf. This subroutine is designed to provide an explicit trap into the operating system kernel so that the operating system may test to make sure that the operation is allowed. In some systems, when the operation is trapped to the operating system, the operating system places the address translations available to the operating system in the memory management unit 20 so that device drivers will be able to access these addresses. In other systems, these address translations are available to the operating system in software. The operating system kernel conducts a permission check to ensure that the application is permitted to perform the operation and then translates the virtual name for the input/output device furnished by the application into the name of a device driver. If the application is permitted to perform the operation, the operating system kernel calls the device driver for the particular input/output resource; and the driver accesses the appropriate physical addresses to accomplish the operation commanded. If the operation involves data in virtual memory which is not presently available in main memory, the operating system moves data around between long term memory and main memory 13 to make the data available and then allows the operation to proceed. If the operation involves a change in context at an input/output device (e.g., the values held in registers and the like which allow the input/output device to carry out the functions commanded by the application), the context is changed by the operating system; and, then, the operation is allowed to proceed. When the driver writes to the virtual address of the input/output device, the memory management unit 20 uses the operating system translations of virtual to physical addresses now available to transfer the command to the input/output device addressed. The device driver actually writes the data of the command for the operation to the registers of the input/output hardware. The input/output device responds to the command by conducting the commanded operation and then generates signals which indicate whether the operation has succeeded or failed. The input/output device generates an interrupt to the device driver to announce completion of the operation. The device driver reads the signals in the registers of the input/output device and reports to the operating system the success or failure of the operation. Then the operating system returns from the trap with the success or failure indication and ultimately returns from the subroutine call reporting the success or failure of the operation to the unprivileged code of the application.

To speed access of memory, a memory management unit often incorporates an address cache such as the lookaside buffer referred to above which provides caching of virtual and physical memory address translations. The address cache typically provides fast translation of memory addresses in over ninety percent of memory operations. A miss in the address cache initiates the page table lookup operation in main memory, and the virtual and physical address translations obtained are stored in the address cache. Since the memory management unit does main memory page table lookups, the central processing unit may proceed with other operations while the address translation is being obtained; and the slowness of the process described above is alleviated to some extent for memory accesses. This helps to speed main memory accesses appreciably.

However, even though input/output addresses are treated as memory addresses residing in locations to which access is limited, the semantics of read and write operations by the central processing unit as applied to memory and to device registers differ in ways that prevent input/output accesses from being cached. Since input/output accesses are not cached, they are slow.

A major reason for the lack of speed may be perceived by recognizing that each input/output operation can only be carried out by trusted software processes of the operating system which checks each operation before it is initiated to determine whether it may be safely carried out. Thus, every access of an input/output device must be trapped into the operating system, tested for permission to proceed, the access accomplished using the operating system software and a device driver, the operation tested for completion, and the results run back through the device driver and operating system software before being handed to the application program which initiated the operation. Most operations are entirely safe and could be carried out without this check. Since no operation which is unsafe can be run successfully on such a system, most unsafe operations will have been eliminated in any software expected to be commercially successful. More importantly, the need for software to take over the operation from the hardware drastically slows operations involving input/output devices.

Not only do input/output operations have to be carried out by operating system software, the design of computers utilizing the PDP11 architecture usually requires that registers at each of the input/output devices be read by the central processing unit in order to accomplish any input/output operation. As central processing units have become faster in order to speed up PDP11 type systems, it has been necessary to buffer write operations on the input/output bus 12 because the bus cannot keep up with the speed of the central processing unit. Thus, each write operation is transferred by the central processing unit to a buffer where it is queued until it can be handled; other buffers in the line between the central processing unit and an input/output device function similarly. Before a read operation may occur, all of these write buffers must be flushed by performing their queued operations in serial order so that the correct sequence of operations is maintained. Thus, a central processing unit wishing to read data in a register at an input/output device must wait until all of the write buffers have been flushed before it can gain access to the bus 12 to complete the read operation. Typical systems average eight write operations in their queues when a read operation occurs, and all of these write operations must be processed before the read operation may be processed. This has made read operations much slower than write operations. Since many of the operations required of the central processing unit with respect to graphics require reading very large numbers of pixels in the frame buffer, then translating those pixels, and finally rewriting them to new positions, graphics operations have become inordinately slow. In fact, modern graphics operations were the first operations to disclose this Achilles heel of the PDP11 architecture.

Another problem with the PDP11 architecture is that the only way to increase system speed is to increase the speed of the central processing unit. There is no system-wide way to accelerate input/output operations as was possible with the IBM and CDC mainframe computers; you can only make the central processing unit go faster. Although a disk controller maker can increase the speed of the disk, from a system standpoint, only the speed of the central processing unit can be increased. There is nothing that the central processing unit does that is special for input/output operations so input/output speed is increased only as central processing unit speed is increased. The system cannot be balanced to suit special purposes.

Overview of the new architecture: The present architecture has been devised to overcome all of these problems of the prior art. This new input/output architecture cooperates with other components of existing systems based on the PDP11 input/output architecture, runs legacy code for those systems, yet is able to drastically increase the speed of input/output operations for new application programs. In order to accomplish this, the new architecture allows read and write operations by application programs to be made directly to the input/output devices. This eliminates the cumbersome multi-step software processes invoked by prior art systems using the operating system and trusted code for every input/output access. In order to accomplish the process safely, the new input/output architecture of the present invention utilizes an input/output control unit which first provides its own virtual name-to-physical-device address translation for all of the input/output devices associated with the new input/output control unit on its own internal device bus. As a part of this translation, the input/output control unit assures that the correct context is present for an input/output device to function with an application program before a first access is allowed. By enforcing this translation, application programs can write directly to input/output devices on the device bus associated with the input/output control unit without affecting assets of other application programs. Once this translation from virtual names furnished by the application programs (input/output device indicators) to physical input/output devices on the device bus is accomplished and context for the application has been furnished to the actual input/output device, translation of addresses of input/output devices on the input/output bus into physical addresses of those input/output devices on the device bus is carried out directly by hardware at the input/output control unit. This hardware also checks permissions; and, when an operation is known to be safe, it is performed by hardware. When a translation operation fails, the operating system software is invoked. Thus, rather than trapping every input/output operation to determine whether it is safe as is done in prior art computer systems based on the PDP11 architecture, the present invention traps and sends to operating system software only unsafe operations and allows hardware to accomplish most translations thereby greatly speeding the access of input/output devices.

The new input/output architecture has been designed so that it eliminates almost all operations which read registers of input/output devices. In order to accomplish this, the input/output control unit includes a first-in first-out (FIFO) unit for storing instructions directed to the input/output control unit. The FIFO unit queues incoming write operations; but, unlike FIFO units used in prior art systems, it stores both addresses and data. This allows the write operations to the input/output control unit to occur asynchronously so that both the central processing unit and the input/output control unit may be functioning independently of one another and neither need wait for operations of the other.

To help maintain this asynchronous operating arrangement and to eliminate read operations to the greatest extent possible, the input/output control unit also includes an advanced direct memory access (DMA) device to assist data transfers involving input/output devices associated with the input/output control unit. The DMA device allows the results of input/output operations to be written by input/output devices to main memory rather than requiring read operations by the central processing unit to obtain these results as in prior art systems. This eliminates almost all need for the central processing unit to read input/output devices and drastically increases the overall speed of input/output operations. The DMA device includes its own memory management unit which allows writes from input/output devices to the virtual memory space of an application program without involving the operating system in the address translation after setup of the translation values.

Figure 2:
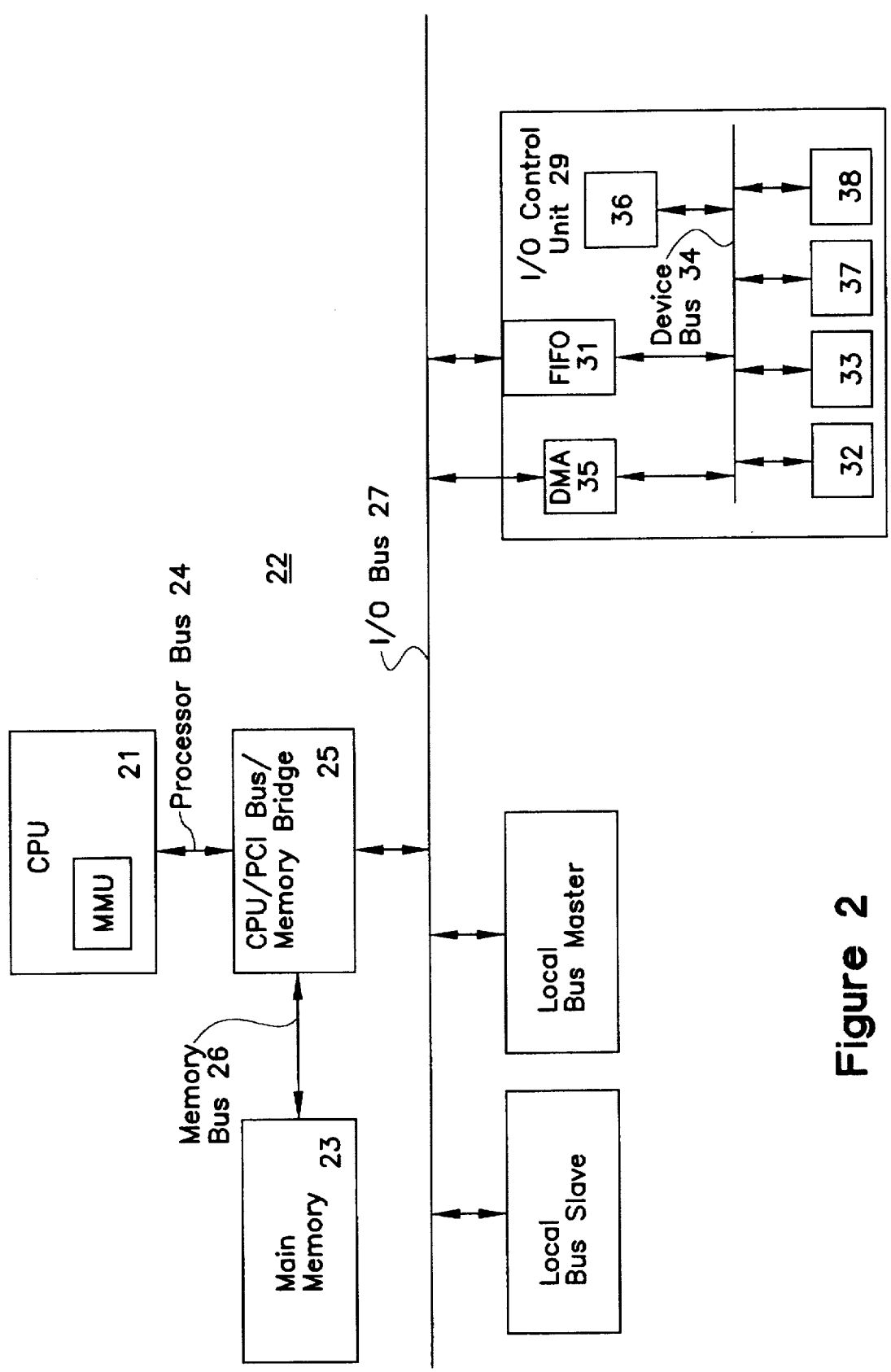
FIG. 2 is a block diagram of a computer system utilizing the architecture of the present invention.

In order to achieve all of these improvements, the present invention utilizes an architecture illustrated in block diagram in FIG. 2. As may be seen, although the input/output architecture may be used with systems utilizing a single input/output bus for all operations, the architecture functions as well in a system 22 utilizing a local bus 27 such as the Peripheral Component Interconnect (PCI) bus or the Video Electronics Standards Association (VESA) local bus which may be associated with other input/output buses. While the discussion of this particular figure will assume that the bus 27 is a PCI bus, the local bus 27 is also referred to in this specification as the input/output bus 27. In arrangements utilizing local buses, the central processing unit 21 and main memory 23 are typically arranged on a processor bus 24 and a memory bus 26, respectively, and are joined to a bridge unit 25. The central processing unit 21 typically includes a memory management unit such as that described above. The bridge unit 25 provides write buffering for operations between the central processing unit 21 and the input/output bus 27, between the central processing unit 21 and main memory 23 on the processor bus 24 and the memory bus 26, and between the input/output bus 27 and main memory 23.

Typically, various input/output devices are arranged on the input/output bus 27 as bus masters and bus slaves. In prior art systems, these local bus masters and slaves are those components (such as a graphics output device for connecting an output display monitor, a local area network, or a hard disk controller unit) which require the most rapid input/output operations for system success. If such local bus masters and slaves are connected to the input/output bus 27, they are utilized with the present architecture for the purpose of running legacy programs and input/output functions not implemented by the input/output control unit 29.

In the new architecture, a single input/output control unit 29 is shown joined to the input/output bus 27. The control unit 29 includes a hardware FIFO unit 31 for receiving incoming commands addressed to the input/output devices on a device bus 34. In this embodiment of the invention, only a single FIFO unit 31 is used although a plurality of FIFO buffers might be used at greater expense in order to further accelerate operations. The unit 29 receives physical addresses on the input/output bus 27 furnished by the system memory management unit and virtual names furnished by application programs for operations to be performed at the FIFO unit 31 and controls the translation of those addresses and virtual names into physical addresses and context for all the associated input/output devices. The hardware unit 29 includes the device bus 34 to which the individual input/output devices such as a disk controller 32, a graphics output controller 33, and a sound generator 37 are shown joined. The unit 29 also includes a DMA unit 35 which is adapted to transfer data between the individual input/output devices and main memory for use by the central processing unit or other components of the system.

Figure 3:
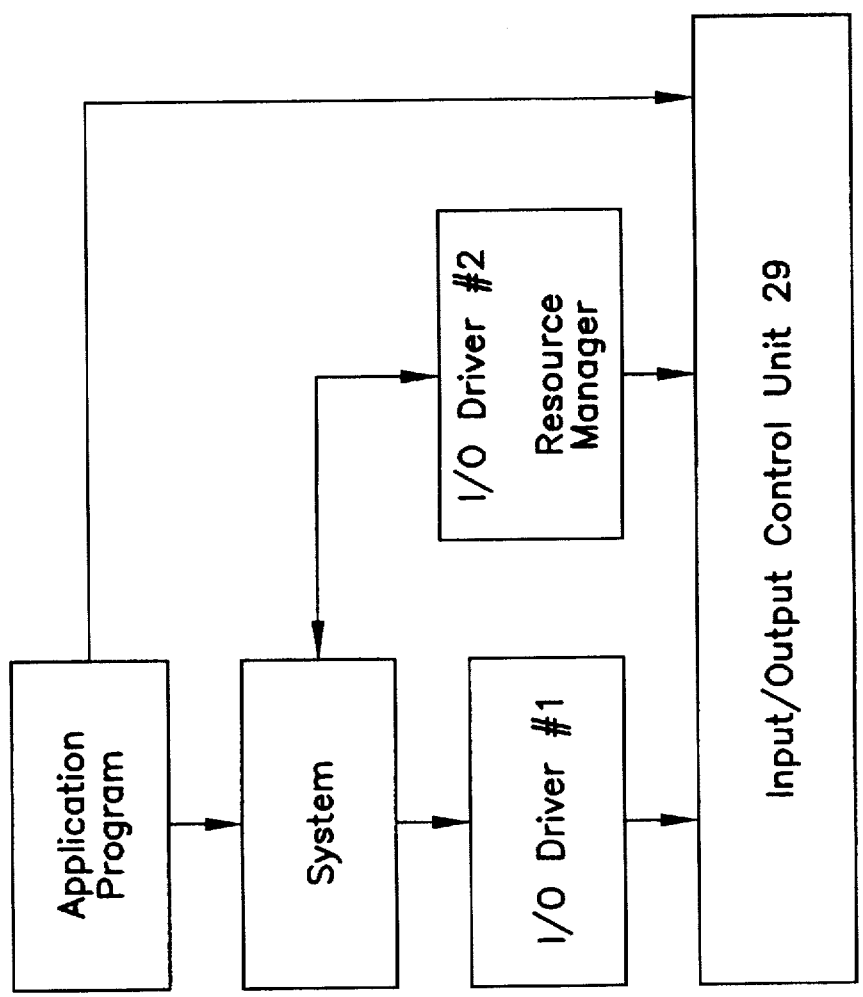
FIG. 3 in a diagram illustrating the operation of software in the architecture of the present invention.

The general operation of the input/output unit 29: FIG. 3 illustrates the manner in which operations are conducted by software in the new architecture. An application program which utilizes the new architecture may issue a command requesting permission from the operating system to map certain of the physical addresses decoded by the input/output control unit 29 into the address space of the application program. The operating system, using a new I/O driver #1, allots some portion of the system physical addresses which the input/output control unit 29 is decoding to the particular application program address space for its use only and installs the virtual-to-physical input/output bus address translations for the application program in the memory management unit. In a typical computer system, the memory management unit stores translations for what are referred to as pages of memory. If the size of the portion of system physical addresses allotted to an application program is a multiple of the memory management unit page size, then the I/O driver #1 can use the memory management unit to ensure that no more than one application program may access each area.

Installing the appropriate translations in the memory management unit of the central processing unit 21 creates a path around the operating system by which the application program may read and write directly to the hardware of the input/output control unit 29. The application program then writes to these allotted input/output bus addresses providing as data a virtual name of its choice for an input/output device on the device bus 34. The input/output control unit 29 takes the input/output address and the virtual name and uses it to first create and then install a translation between input/output bus addresses and device bus addresses in its internal hardware and to place the context required by the application program in that input/output device. Once this has occurred and for so long as the application program continues to run, the application program writes commands which the memory management unit associated with the central processing unit translates to the physical addresses on the input/output bus 27 for the input/output control unit 29; and the input/output control unit 29 further translates the input/output bus addresses of the commands to physical addresses of input/output devices on the device bus 34. In this way, the application may write directly to the input/output unit in order to utilize an input/output device such as the graphics output controller 33 without requiring any software intervention by the operating system.

As will be understood from the more detailed description which follows, the use of many identically-sized input/output device address spaces each assigned for use only by one application program allows the input/output addresses to be utilized to determine which application program has initiated any particular input/output write operation.

Creation of a safe translation for an input/output device: When the code of an application program is written to take advantage of the new architecture, a safe translation for an input/output operation utilizing a physical input/output device must first be created. A safe translation for an application to utilize an input/output device requires not only a correct physical address for the device but also correct context so that the device will function appropriately with the device. Since an application program may utilize the same input/output device for different purposes each requiring different context, the physical address and the correct context are sometimes referred to in this application as a "logical input/output device." To create such a safe translation, the application program sends a first special calling command adapted to call an input/output device to the input/output control unit 29; this special calling command includes as data a predefined name such as "LINE_DRAWER" selected in accordance with a prescribed naming convention. The command is transferred directly to the FIFO unit 31 where it is placed in the FIFO queue. At this point, the central processing unit 21 may go off to other work. When this special calling command reaches the bottom of the FIFO unit 31, no translation between this virtual name (e.g., LINE_DRAWER) and a physical address on the device bus 34 is resident in hardware. The lack of a translation indicates an unsafe operation and causes an interrupt; and the predefined name is sent to a second new input/output driver associated with the control unit 29 called the "resource manager." The resource manager keeps an internal data base of data structures representing input/output devices with physical addresses and contexts under the predefined names. The resource manager looks up this known predefined name in its internal database of data structures with predefined names and finds the data structure defining that device in the data base. The resource manager makes this predefined data structure available for immediate use.

In one embodiment, the data structures are created as objects in an object oriented language. At times hereafter, the data structures will be referred to in this specification as objects. Moreover, commands provided to manipulate such objects are typically referred to as methods; and so, in this specification, commands used to manipulate the data structures are sometimes referred to as methods.

In order to utilize the general device definition provided by the predefined data structure, the application program then sends a "create" command and provides as data its own virtual name for that device and context. The resource manager creates an instance of the predefined data structure in its internal database naming that specific instance with the virtual name the application furnishes (e.g., MY_LINE_DRAWER). Thus, in contrast to all prior art hardware which provide for address translations, the present hardware allows the user controlling the application program to select by explicitly providing a large (e.g., thirty-two bits) arbitrary name to be used in choosing the translation which is to be used by a hardware address translating unit.

This new data structure includes the various properties of the general device from the data structure with the predefined name including the physical address on the device bus 34 of the input/output hardware which provides the function for the predefined name and a general set of context required by the hardware for operation. At this point, the application program may provide commands to modify the context stored by the new data structure to optimize the operation of the input/output device with the application program.

Using a data structure: When the application program later wants to utilize the newly-named data structure representing an input/output device, the application program writes the virtual name chosen with the special calling command which calls a data structure for the input/output device. The resource manager looks up the new data structure which has been created and (for a physical device) finds the context and physical address on the device bus 34 for the particular input/output device now described by the name. The resource manager changes any context required by the new input/output device which has been named to run the application program. The physical address on the device bus 34 which has been found is then placed in hardware to provide a translation from the input/output bus addresses. When subsequent commands are sent to the same input/output device from the application program, they find the hardware translation and are routed directly to the particular addressed input/output device on the device bus 34.

Unsafe operations: In any case in which the input/output device to which the operation is directed is unknown to the hardware of the control unit 29 (an unsafe operation), the unit 29 calls the "resource manager" which runs on the central processing unit and functions as a portion of the operating system. The resource manager determines how the operation is to be handled. The operation may be a write by a new application program (such as that described above) requiring various set up operations before it may proceed. If an operation requires various context changes at the input/output device, this is handled by the resource manager before an address translation for the device is placed in hardware. If an operation requires a procedure which is not yet in order under the operating system such as requiring data from memory which is not in memory at that time, the resource manager transfers the command to the operating system to perform the necessary memory transfers (or the like) which allow the commanded operation to proceed. Alternatively, the operation may be directed to a device which is not otherwise associated with the control unit 29 such as a LAN interface or other bus master or slave on the input/output bus 27 which is not manufactured to cooperate with the unit 29. If such a device is addressed, the command is directed to the operating system by the resource manager and handled by the operating system in the normal manner for input/output devices of the prior art.

Thus, when an operation is unsafe as signified by not having a translation available to it in hardware, the command is sent to the resource manager to assure that only safe operations can be performed.

Address translations in hardware: When the operation involves a device directly associated with the control unit 29 on its device bus 34, the commands after the first commands which are handled by the resource manager (creating the new data structure, attaching its new virtual name, providing any necessary device context, and creating the address translation) are sent by hardware directly to that device for execution. If the command requires that data be transferred to or from the application, the input/output device performs the transfer using the DMA unit 35. Upon the return of data to an application program in response to a command, the DMA unit 35 of the control unit 29 responds by transferring the data to main memory and notifying the central processing unit in a separate DMA operation of the existence of the data so that no input/output bus read operation by the central processing unit 21 is necessary to ascertain the result of the operation or to receive the data provided.

Legacy applications: In contrast to the operations discussed above, if an application program does not utilize the advantages of the present invention, it may still function in the manner of existing applications running on prior art systems. For example, older application programs operating in a multitasking system which have no knowledge of the present invention and are attempting a subroutine call to request the operating system to perform an operation using an input/output device associated with the unit 29 will trap into the operating system where its permission to proceed will be checked. The operating system will translate the call to the appropriate physical address and, finally, call the trusted code of the new system I/O driver #1 to execute the command. The new system I/O driver #1 functions in the manner of a typical driver of the prior art and executes the command by writing from its library of operations to the input/output control unit 29 in the manner described above for application programs with knowledge of the input/output control unit 29. In fact, the new I/O driver #1 functions in a manner essentially identical to an application program with knowledge of the control unit 29 by providing a virtual name for the device specified to which the physical addresses for that device may be attached with a command calling the device. The new driver #1 has mapped to its address space a portion of the physical addresses decoded by the unit 29. The command data generated in response to the command from the older program is then transferred by this driver to the FIFO unit 31 and processed in the same manner as are direct operations from an application with knowledge of the unit 29. Although this new I/O driver #1 functions as do other prior art drivers requiring the use of the operating system and stepping through the various stages of translation and permission checks, legacy software may utilize the architecture of the present invention without any additional requirements being placed on the system other than those which exist in the prior art. Moreover, this legacy code will run faster than on prior art systems because of the asynchronous result provided by the FIFO unit 31 and the write only operation that unit supports.

Figure 4:
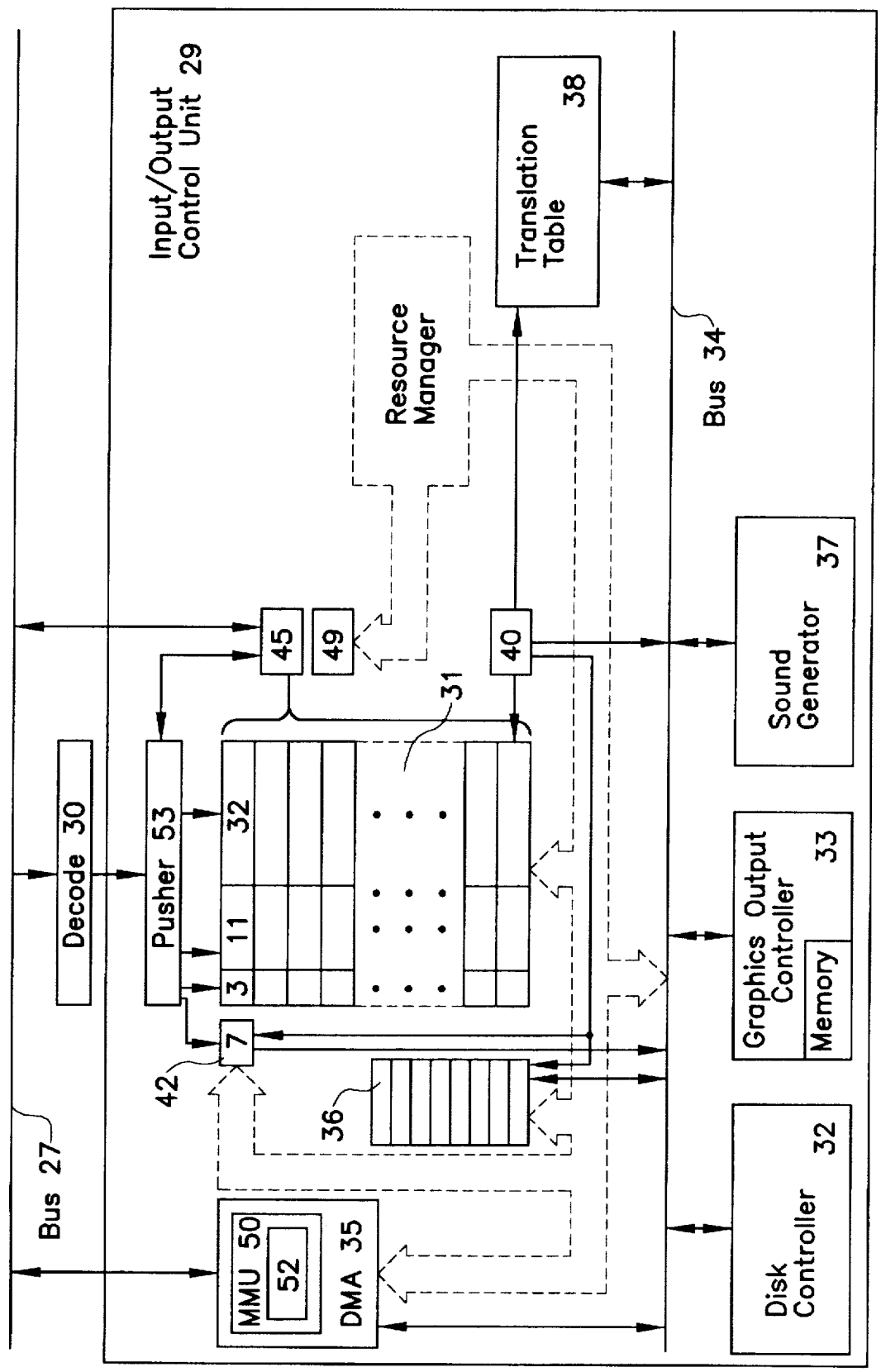
FIG. 4 is a block diagram of a portion of a personal computer system such as that illustrated in FIG. 2 designed in accordance with the present invention.

Specific details of the new architecture, the FIFO unit: FIG. 4 is a block diagram illustrating details of an embodiment of the input/output control unit 29 including the device bus 34 and the input/output devices arranged on that bus. As described above, the input/output control unit 29 includes a decode unit 30 which receives commands directly from the input/output bus 27 and transfers the commands to a pusher circuit 53 which transfers the command to the FIFO unit 31. The FIFO unit 31 stores the data and the addresses for each of the commands being transferred to the input/output devices associated with the input/output control unit 29. The FIFO unit replaces the individual data registers used by input/output devices of the prior art for receiving data. However, in contrast to the registers used by the prior art for communication on the input/output bus 27, the FIFO unit 31 allows many more commands to be processed much more rapidly and facilitates the asynchronous operations of the input/output devices and the central processing unit. In one embodiment, the FIFO unit 31 has thirty-two stages. This allows it to hold thirty-two individual serially ordered commands at any time. Although in one embodiment each of the stages of the FIFO unit 31 holds (along with the address bits) the data held by an individual register of a typical prior art input/output device, the system has the ability to store commands for over sixteen thousand 32 bit registers for each of 128 different application programs which may map different addresses decoded by the input/output control unit 29.

Figure 5:
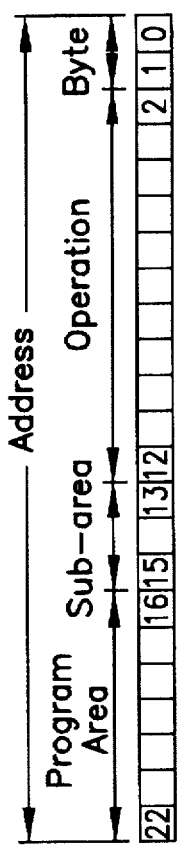
FIG. 5 illustrates the address and data bits utilized in one embodiment of the invention.

The address and data space for each command are pictured in FIG. 5. In one embodiment, twenty-three bits of address space, and thirty-two bits of data space are provided. The twenty-three bits of address space are sufficient to map eight megabytes of address space on the input/output control unit 29. The eight megabytes of address space is divided into the 128 individual areas each having 64 Kbytes which may be allotted by the operating system to an application program. The upper seven bits of the address space are utilized to represent the 128 distinct areas which are available.

There are a number of different embodiments of the FIFO unit 31 which may be used in the present invention. These include two general types of units. One type of FIFO unit (not shown) includes an individual FIFO buffer for each of the 128 individual areas (a total of 128 FIFO buffers in an embodiment having this many address areas). Another type of FIFO unit 31 includes typically one FIFO buffer for each general purpose processor used in the system. In the second embodiment of the FIFO unit, the use of each FIFO buffer is shifted among the various address areas assigned to different application programs so that it functions as a FIFO cache. This specification discusses in detail the second FIFO cache embodiment using a single processor and a single FIFO buffer because it is the more complex of the two embodiments. Those skilled in the art will easily understand the first type of unit which utilizes a plurality of FIFO buffers from the discussion of the more complex unit.

Addresses: In one embodiment of the more complex FIFO unit, the entries in the FIFO unit 31 include thirty-two bits of data space and twenty-three bits of address space. In another embodiment of the more complex FIFO unit which is discussed in detail hereafter, only fourteen bits of address space are provided in the FIFO unit 31 while the upper seven bits are held in a register to reduce overall FIFO size and the lowest two bits are dropped because the data bits are word aligned. The upper seven bits of the address represent the 128 distinct areas of address space which are available and thus define the particular application program utilizing the FIFO buffer 31. When a first command from an application program is transferred to the input/output control unit 29 having an empty FIFO unit 31, the seven bits representing the area designated for that program are placed in a register 42 (in the embodiment utilizing a register) where they are held until the application using the FIFO unit 31 changes. Since each area is assigned to only a single application program, the FIFO unit 31 is in effect a cache for the addresses and data of the particular one of the application programs presently having access to the input/output control unit 29.

The addresses of each of these 128 areas are subdivided into eight separate sub-areas each having eight Kbytes of address space. The next lower three bits of the address space represent these eight sub-areas. The application program treats each of the eight sub-areas identically, designating at various times the physical addresses and the context of various input/output devices or data structures which represent particular input/output devices and their context, to be accessed through each sub-area. As will be seen later, each of these sub-area addresses represents one of eight registers which may store the physical address of an input/output device on the bus 34 and thereby provide an address translation or may store a special value to indicate a software process (e.g., calling a data structure representing an input/output device) is to be run. The two lowest bits of the address space represent byte positions in a command; in the preferred embodiment, the data is word aligned, and these bits are not included in the FIFO buffer 31.

Consequently, eleven bits are left to represent a particular operation using the particular input/output device designated by the address translation in the sub-area. With eleven bits of address space, 2048 individual operations (or portions thereof) are available for each sub-area. As mentioned, in one embodiment the data structures are created as objects which represent the devices and their contexts which may be addressed in the sub-areas. The commands to the devices are then encoded as methods on each of these objects. This encoding of a sub-area as an object of a particular class is dynamic, and a new object representing a new device and its context may be encoded in the sub-area by an application program writing the special calling command which calls a device to the sub-area holding the address translation of any object.

As pointed out above, when a program which is able to utilize the present invention first requests that the operating system map a portion of the addresses decoded by the input/output control unit 29 to its address space, the operating system assigns physical addresses designating one of the 128 sixty-four Kbyte address areas of the input/output control unit 29 address space to the application. Thereafter, the application program writes a command with a virtual address to the memory management unit. The virtual address for this command is translated by the memory management unit hardware into a physical address on the input/output bus 27 and sent directly to the input/output control unit 29 at the physical address. The seven highest order bits of the physical address designate the address area assigned by the operating system to the application program. Since the I/O driver #1 is constructed never to map more than one application program to an address area, the seven bits also identify the application.

When an application program writes to the FIFO unit 31, the seven upper bits of the address are used to determine the sixty-four Kbyte address area which the application has been allotted by the operating system. The three bit sub-area designation is the physical address on the input/output bus 27 used to select one of the eight Kbyte sub-areas which may be allotted to a device. The eleven bit offset is used to determine the method for (the command or operation to be carried out by) the device, and the thirty-two bit data space is used for the data related to the commanded operation. In a typical write operation, the write to any particular eleven bit offset invokes a particular method (a command defining the operation to be performed) on the object (the input/output asset designated by the present name for the sub-area). However, these eleven bits are also interpreted (1) to create a new data structure representing input/output devices which respond to virtual names given by the application program, (2) to provide direct translations from virtual names to physical addresses of input/output devices on the device bus 34, and (3) to call the resource manager to perform various software operations.

Figure 7:
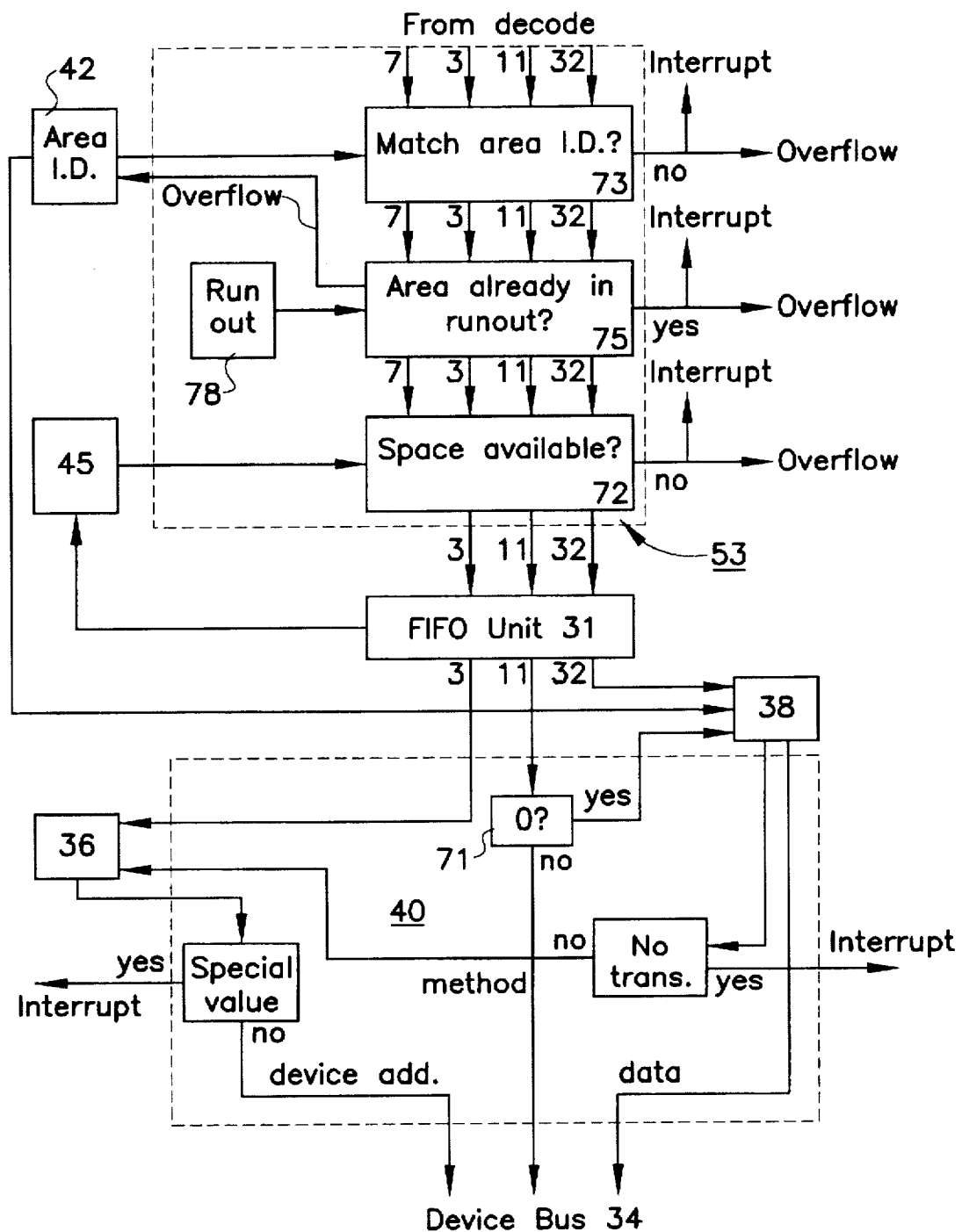
FIG. 7 is a block diagram illustrating details of the circuit of FIG. 4.

The puller circuit, current address registers, and translation table: These operations are accomplished by various circuitry and the resource manager, particularly by a puller circuit 40, a current physical address table 36 which includes eight registers capable of holding address translations for devices presently in use, and a translation table 38 which may include a much larger number of address translations. The puller circuit is illustrated in more detail in FIG. 7. In order to correctly direct the address and data provided in each command, the puller circuit 40 reviews the address of the command about to be executed at the bottom of the FIFO buffer 31. The puller circuit 40 includes logic which first uses the three sub-area bits of the address to determine which one of the eight current address registers of the current physical address table 36 has been selected. This current address register will contain the physical address of the input/output device on the device bus 34, will receive the physical address of the input/output device which results from a lookup in the translation table 38, or will indicate a software process is to be run be the resource manager.

Writes to zero offset The puller circuit 40 also includes logic circuit 71 which then determines whether the next eleven method bits of the address are all zeroes. If the eleven method bits are all zeroes, this indicates a write to the zero offset which is the special calling method used for indicating that the application wants a new translation for an input/output device; and the puller circuit 40 sends the data to the translation table 38 along with the upper seven bits of the address indicating the area and performs a lookup. It will be recalled that when the write is to this special calling method, the data is the virtual name of a device. The result of the lookup is usually an address on the device bus 34 and a physical instance number defining context which are placed in the register of the table 36 pointed to by the three sub-area address bits. When the physical address and instance number are placed in the register of the table 36, the puller circuit sends the seven bits indicating the area and the instance number to the input/output device to change the context on the device. The input/output device uses the seven bits indicating the area and the instance number to assure that it has the correct context. Thus, by writing to offset zero an application program causes an input/output-bus-to-device-bus translations to be made available for immediate use and the correct context to be provided on the device for use with the application before an address translation is used.

Thus, in contrast to all prior art arrangements which furnish address translations, the present arrangement allows the application program to select the particular translation which is to be available in the table 36 to translate from system addresses to device bus addresses. In the prior art, this selection has always been accomplished by the operating system.

Writes to non-zero offset: If the method offset is not zero, the puller circuit 40 takes the three bits indicating the sub-area and indexes into the table 36 to the proper register to find the device bus physical address. The puller circuit 40 concatenates that address with the eleven bit offset designating the method and writes the method and thirty-two bits of data to that physical address on the bus 34. However, if instead of a physical address, the value read from the sub-area of the table 36 is a special value which indicates a failed translation, the puller circuit 40 generates an interrupt which calls the resource manager. The resource manager then uses the command at the bottom of the FIFO buffer 31 to perform whatever software operation is required by the command. This assures that unsafe operations are always handled by the operating system.

Figure 6:
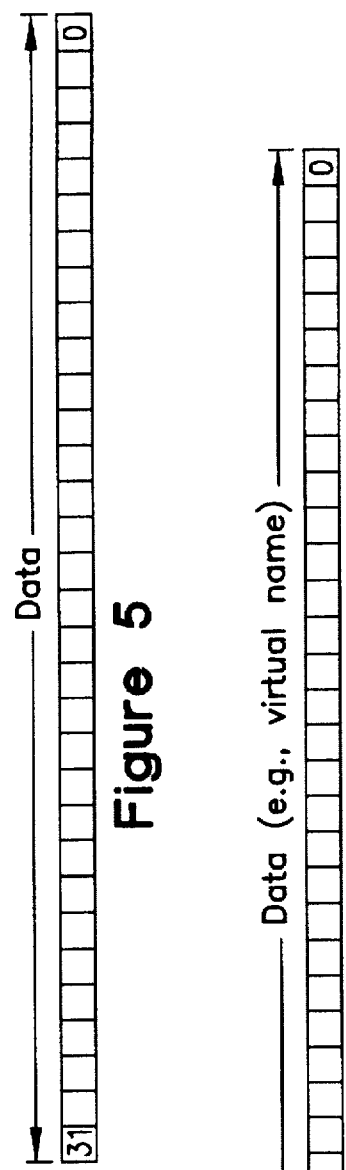
FIG. 6 is an illustration of entries in a translation table used in accordance with the invention.

FIG. 6 illustrates in the first two lines one entry in the translation table 38 utilized in one embodiment of the present invention. In the specific embodiment described, the translation table 38 may be designed as a hash table in order to provide an even distribution of entries in the storage space available. The use of a hash table allows the name provided by the application program to be used with the area address as a key to derive an index for storing a translation value. As may be seen, the seven bits of the address designating the area assigned to an application program and the thirty-two bit virtual name translate into twenty-three bits seven of which indicate the address of the physical device on the device bus and sixteen of which indicate the instance of the data structure which provides the context to be placed on the input/output device. Additional control bits may also be included as a part of the translation data stored in the table 38 but are not shown. The hash table form is especially convenient because the lack of a translation typically returns a zero which may be used as a special value in the table 36 in the manner described herein. Alternatively, the table 38 may be arranged as a lookaside buffer with the seven bit area value and the name used as the index to derive the physical address. Each of the last two lines of FIG. 6 indicates one way in which the bits obtained in the translation are used. The eleven bits indicating the method invoked are concatenated with the physical address for the device retrieved from the translation table 38, and the concatenated value is placed on the bus 34 with data. Each of the input/output devices decodes addresses on the bus 34 to determine if it is the addressed device and responds accordingly to the operation indicated by the method.

Creation of a data structure: When an application program first writes to the area which it has been allotted by the operating system and presuming that no other application is presently utilizing the FIFO unit 31, the command is ultimately reviewed by the associated puller circuit 40. The puller circuit will find that the application program has selected one of the sub-areas using the three bit sub-area designation, selected an offset zero using the eleven bits, and has written a predefined name for a particular input/output device in the thirty-two bit data space. When the application program selects a zero offset as the eleven bits representing an operation, the application is indicating that it desires to call a data structure which has been named and make it immediately available for use. When a zero value is written as the eleven bit offset to any one of the sub-areas, this instructs the input/output control unit 29 to make available that one of the sub-areas to the newly-named object and to interpret eleven bit offsets within the sub-area as the various methods which are available to an object of that class.

When the register holding the translation for a sub-area has been allotted to the particular object, the methods of that object are thereafter invoked by writing to the different eleven bit offsets available for that particular object. Since there are eleven bits available in a sub-area of 8 K bytes, 2048 different methods may be invoked on each object. This provides a sufficient number of different possibilities (methods) to suffice for most devices which an object may define.

When the application program writes the name of a data structure as data to offset zero of a sub-area, the puller circuit 40 takes the virtual name, adds the seven bits designating the area, and looks up the concatenated value in the translation table 38 to obtain the physical address on the device bus 34 and the instance of the physical device which is responsible for the operation represented by the particular object being named. If a translation is in the table 38, the physical address on the bus 34 of the hardware (e.g., line drawing hardware in the graphics rendering engine) should be returned and placed in one of eight positions (registers) of the current physical address table 36 designated by the three bit sub-area to which the zero offset was written. However, if the translation for the physical object does not exist in the translation table 38 of the input/output control unit 29, the translation table 38 returns a miss and places a special value (all zeroes in one embodiment) in place of the physical address in the addressed register of the table 36. The miss transfers the operation to the resource manager which uses the command at the bottom of the FIFO buffer to perform whatever software operation is required by the command. Thus, a miss in the translation table 38 may be used to trap operations which require context switching before a device is allowed to perform an operation.

Because on a first write to the input/output control unit 29 by an application program, there will be no translation for the named data structure in the translation table, the operation will be transferred to the resource manager. The resource manager in the preferred embodiment of the invention has access to the database which includes the data structures for a number of predefined objects. These objects may represent hardware or software which implements various portions of the input/output operations. When an application program writes the name of a predefined object at an offset zero in one of the eight sub-areas, this is a request to the resource manager to make the predefined object one of the eight objects available for immediate use at the addressed one of the eight sub-areas.

The resource manager reviews the details of the command being written and determines that is a write to a zero offset. This causes the resource manager to look at the predefined name to determine the class of the object. When it determines that this is a name for one of the predefined general classes of objects associated with the input/output control unit 29, the resource manager looks up the data structure for that object and makes that object immediately available. To make the object immediately available, the resource manager allots the sub-area to the predefined object but also places a special code in the table 36 to indicate that the object is a software object and the resource manager is to be called when the predefined object is addressed.

The application program follows this command calling the predefined data structure with a command directed to the same sub-area to create an instance of the predefined data structure in the database and name it as the application program defines in the data bits of the create command. The resource manager interprets the create command as a create method for the predefined object and creates a new instance of the predefined class of objects, names the instance using the name requested by the application program, and stores it as a new data structure in the object database.

Modifying context of newly-created data structure: If the application program desires to modify the context values of the input/output device for which it has created a new object, it writes the name it has selected for the object as data to the zero offset address. The puller circuit 40 causes a lookup in the translation table 38 using the new virtual name and the seven bit area identification. Again, there will be no translation for that virtual device name in the translation table 38 since the data structure which has been created is a software object which has no translation in the table 38; the special value is placed in the table 36 to indicate a software object;

and the operation will be transferred to the resource manager. The resource manager reviews the command and determines that is a write to a zero offset. This causes the resource manager to look up the new data structure with that virtual name in the object database to find the object which defines the input/output device. The resource manager uses the seven bits designating the area allotted to the application program and the thirty-two data bits providing the virtual name given by the application to find objects in its database. When the resource manager finds the data structure, it places the special value in the addressed register of the table 36 instead of an address on the device bus 34 to indicate that this is still a software device. Until the physical device is utilized, the application program may send various commands as methods on the new object; and these will be executed by the resource manager. A plurality of low numbered offsets are utilized for modification of a software data structure. For example, the application program may send commands which set the details of the appropriate context values for that particular device functioning with the particular application for the particular purpose. This changing of context from the context provided by the predefined data structure typically occurs before the device is utilized while only the software object is affected.

Placing safe translations in the translation table: Ultimately, when a physical input/output device receives a command which makes a first use of the physical device, the resource manager places a translation for the particular virtual-name-to-device-bus-address of the appropriate physical device in the translation table 38.

It should be noted that the virtual name selected by an application program for a particular data structure representing an input/output device and its context is used for the later retrieval of the address translation for that that input/output device. In fact, a number of different application programs may use the same virtual name for the same or different virtual objects without causing any ambiguity because each object created has its own separate area address bits which relate to that application alone.

In any case in which a translation for the virtual name to the device bus address for a new physical object is placed in the translation table 38, a number of additional bits which define the instance of the data structure and therefore indicate any context which is presently a part of the data structure and is necessary for the operation of the device with the application is also stored in the translation table 38 by the resource manager. Finally, the resource manager restarts the write operation. The lookup in the translation table 38 then succeeds. This causes the physical address and instance value (also called context value) to be placed in the register of the table 36 and the puller 40 to send the seven area bits and instance value to the input/output device to change the device context.

When an application program writes the virtual name of an object to offset zero in one of the sub-areas, and when the lookup in table 38 of that virtual name succeeds, the physical address of the corresponding device on the device bus 34 and the instance value are also stored in a slot of the eight entry current physical address table 36 which slot corresponds to the sub-area to which the virtual name was written. The table 36 stores the physical address on the device bus 34 of the device corresponding to the current object accessible in that sub-area, if there is such a device. If there is not a physical device or there is no translation in the table 38, the entry stores the special value which has no translation and therefore causes the input/output control unit 29 to interrupt into the resource manager.

It should be noted that the resource manager is involved only if a translation for the virtual name cannot be found in the translation table 38 and is therefore considered to be unsafe. This may happen when the context for the object is not in an appropriate device, and the device in question cannot perform its own context switching. It may also occur if the object in question is of a class that is always implemented in software because there is no corresponding device on the device bus 34. It may also occur if the translation table 38 is full and if other resources necessary to implement the object are exhausted.

When the physical address on the device bus 34 and the instance value of the device corresponding to the current object are first placed in a register of the current address table 36, the address is used by the puller circuit 40 to send the instance value and the seven bits indicating the application program (and the address area) to the device on the device bus 34 (see line three of FIG. 6). The device compares the seven bits and the instance value to the area and instance it is presently utilizing. If they differ, the device changes its context or interrupts the resource manager to change its context so that the device is properly initialized for the application program.

An input/output device may have a plurality (N) different contexts available to it and may select among these contexts in a number of ways. Some portion of the instance value may be used to select among the N possible contexts, while another portion may be used to actually set context. If there is enough space on the input/output device, the device may have internal registers to hold all of the N contexts and may select the appropriate context depending on the selection portion of the instance value. If there is not enough space on the input/output device, the device may have a single set of internal registers to hold context; when the device receives the instance value, the device may use the selection portion and fetch the appropriate context from local memory and place it in the internal registers. An input/output device may also have a single set of internal registers and another internal register holding a value indicating the context presently stored in the internal registers. If the number in the last mentioned register matches the an instance value, the context remains the same. If the values differ, the input/output device interrupts and asks the resource manager to perform a context switch to the context selected by the selection portion of the instance value.

Thus, whenever an application program selects a different input/output device to utilize a sub-area of the address space by writing to offset zero of a register of the table 36, the change of input/output device causes the puller to send the area bits and the instance value to the input/output device to change any required context.

Writing directly to input/output devices: With the address translation in a register of the table 36, when a next write occurs to that object as indicated by the three bits of the address selecting the register for the particular sub-area, the offset address will typically be other than zero. This offset will indicate the method invoked on the object. This method (indicated by the eleven bits) is concatenated with the physical address held in the table 36 (see line four of FIG. 6) and broadcast on the device bus 34 to select the particular input/output device and the operation indicated by the method which is to be performed by that device. All of the devices on the device bus 34 listen on the bus and decode commands addressed to them.

Current address registers and sub-areas: Since eight sub-areas are available at once through the current address table 36, an application program may write up to eight virtual names for devices the application desires to utilize in input/output operations and have physical addresses for those devices immediately available by simply writing the virtual name to the zero offset of a sub-area. As has been explained, this is initially accomplished for each device by writing a predefined object name to the zero offset to place that object in a sub-area, creating an instance of that predefined object representing an input/output device using a virtual name chosen by the application program, writing the new name as data to the zero offset to place the newly-created object in a sub-area, and calling the resource manager when it is found that there is no translation for that device name in the translation table. The resource manager determines that is a write to a zero offset, finds the data structure for the newly-named object, stores a translation for the virtual name to the device bus address of the appropriate device in the translation table 38 along with the instance value indicating the device context, causes the puller to store the context for the named object in the physical device, and restarts the write operation so that the lookup in the translation table 38 succeeds and so that the physical address of the corresponding device on the device bus 34 is stored in the register of the current physical address table 36 which corresponds to the sub-area to which the virtual name was addressed. Thus, the application program may select each of eight objects representing devices for which the translations are then immediately available in the registers representing the eight sub-areas.

Thus, up to eight objects (devices) may have address translations immediately available in the table 36 for the application program using the FIFO unit 31. For example, one sub-area may have addresses for a line drawing object. This object will respond to various of the 2048 possible methods available to provide different operations by that device. One of the methods may designate the beginning point of a straight line; another may designate the end of the line. By invoking these methods on the line drawing object in order, a line may be caused to be drawn on the display by a hardware graphics engine. Another of the sub-areas may hold a color table. Commands to this sub-area may invoke a method to fill a portion of a color table of a hardware digital-to-analog converter to control the color mode of the output display. It should be noted that it is possible for an application program to have a number of differently named data structures and associated contexts for the same actual physical input/output device. For example, an application program may provide different context values for color tables to provide different display results. To make sure that the correct context is on a device, whenever an application program switches to a different register of the table 36, the change of sub-area address causes the puller circuit 40 to send the address area bits and the instance value to the input/output device to change any required context.

Changing the input/output device in a sub-area: The eight sub-areas available provide a large number of output options for an application program. The availability of eight sub-areas allows the application to accomplish a number of functions without the necessity of a translation table lookup and thus speeds input/output operations. However, since any application program may need to have access to all of the input/output assets which are available, the system provides a rapid manner of providing assets in addition to the eight devices which are represented by objects which fill the eight sub-areas allotted to that application program. When all of the eight sub-areas have been used by an application program so that input/output-to-device bus physical address translations for a device exist in each of the eight spaces in the table 36 and the application program running desires to write to a different input/output device, the application program may select a new device which it desires to use and place its address translation in the table 36 in place of any address translation presently occupying one of the registers. To accomplish this, the application program writes a new virtual name of a device as data directed to the zero offset of any of the eight sub-areas. This causes the input/output control unit 29 to replace the object presently occupying the sub-area with a new object representing the device indicated by the newly presented virtual name. This is accomplished by the puller circuit 40 initiating a lookup in the translation table 38 and a replacement of the device bus address and instance representing context in the table 36 designating the object presently in the sub-area with the device bus address of the new device if a translation for the new object for the physical device has already been placed in the translation table 38 by the resource manager. Whenever an application program places a different translation in a register of the table 36, the change of address causes the puller to send the area bits and the instance value to the input/output device to change any required context.

However, if this is the first use of this object by the application program, the name-to-physical-address-translation is not in the translation table 38. The new virtual name causes the virtual-name-to-physical-address translation to miss in the translation table 38 so that the operation is trapped and sent to the resource manager. Presuming that an instance of a predefined data structure has already been created under the virtual name, the resource manager recognizes the zero offset as calling for a new object, reviews the new name, and finds the data structure for that name in the database. It uses the object data structure to obtain the instance value indicating the context for that new input/output device and writes the virtual-name-to-physical-address translation and instance value into the translation table 38. The operation then proceeds and succeeds, the physical address and instance value for the object is placed in the current physical address table 36 in the sub-area in which the object being replaced previously resided, and the context of the device is updated. When the next write occurs for that named input/output device, the physical address translations for that device (object) will be in the current physical address table 36 so that it may be immediately placed on the bus 34. Thus, the resource manager is called and assures that the context on an input/output device is correct before its address translation is placed in the physical address table 36.

Whenever any object is named for which the physical address is not in the current physical address table 36 but for which a translation is available in the translation table 38, the lookup of that virtual name succeeds, the physical address and the instance value of the corresponding device on the device bus 34 is stored in a slot of the current physical address table which corresponds to the sub-area to which the virtual name was written. Thereafter, writing to an offset to this sub-area selects the particular input/output device and the operation (indicated by the method) which is to be performed by that device. In this manner, the tables 36 and 38 act as a two level cache for object name translations selected by the application program which the application utilizing the FIFO unit 31 may immediately access and makes an extraordinarily large number of operations available even though the physical address space allotted to the program is limited.

Although 2048 operations are available for each object which is physically on the device bus 34, it is probable that some number of the operations (methods) will not be implemented in hardware. When an input/output device receives a command including a method which it cannot carry out, the device addressed responds to the command indicated by the offset by saving the method and data received and generating an interrupt indicating that the hardware cannot deal with the operation. The interrupt calls the software of the resource manager so that the resource manager may accomplish the operation using the method and data saved. This allows those operations which are invoked very infrequently to be carried out in software, while those operations which are used frequently are implemented in hardware in order to speed up the system. In order to assist this operation, each input/output device on the device bus 34 also provides a signal to the puller circuit 40 to signal the puller circuit that no commands are to transferred to the input/output device which has generated the interrupt until the interrupt servicing has been completed.

Thus, as may be seen, the resource manager is a piece of software which is associated with the input/output control unit 29 and determines that the input/output control unit 29 functions correctly. It maintains a database of data structures which represent the various input/output devices and the context that those devices require to function correctly. It fills the translation table 38, initiates the necessary context switching for initializing the physical devices, provides routines for less used input/output operations which input/output devices may invoke through interrupts, and does other things required to run the input/output control unit 29. The resource manager may be thought of as part of the operating system and takes the place of the device driver used in a conventional input/output system. The resource manager maps in a part of the physical hardware of the input/output control unit 29 called the privileged address space. This space is distinct from the FIFO unit. Unlike the application programs operating with input/output devices, the resource manager both reads and writes this address space to perform its various tasks. Unlike all of the device drivers of the prior art, the resource manager accomplishes its functions after the hardware of the input/output control unit 29 has been directly addressed by an application program rather than before. Moreover, in the overall operation of the input/output control unit 29, the resource manager is used infrequently compared to the hardware portions of the input/output control unit 29 since the resource manager attends only to creation operations, the various software implementations of methods, and unsafe operations.

The new architecture provides an extraordinary amount of flexibility for an application program. In the embodiment illustrated, the FIFO unit 31 is dedicated to the use of a single application at any time. Since an address area is mapped to the address space of only one application program, all of the commands in the FIFO unit 31 are directed to responding to that program. Moreover, once an object has been made accessible in a sub-area, the three bits designating that sub-area indicate the meaning of the eleven bits designating the operations which apply to the object in that sub-area. The name of each object has thirty-two bits (the thirty-two data bits written to offset zero) of argument. Thus, if each of the methods or commands available to each of the objects is considered to function in the manner of a register, there are four billion objects which may be addressed and there are 2048 registers available to each object. This provides thirty-two terabytes of methods for input/output devices available to each application program.

Transferring the FIFO unit between application programs:
The input/output control unit 29 also functions to rapidly switch between application programs. When in the illustrated embodiment the input/output control unit 29 is responding to commands from one application program and receives a command from a second application program, the FIFO unit 31 changes and links itself to the second program. If the FIFO unit is empty, this may occur immediately. If the FIFO unit is filled with commands from the first application program, these commands will be executed before the commands of the new application program are handled. In some cases, this may require that the commands from the second program be written into local memory associated with the input/output control unit 29 so that their execution will be delayed until the commands from the first application program have cleared the FIFO unit. In this way, the FIFO unit 31 appears to furnish an individual FIFO unit for each of up to 128 incoming programs in this particular embodiment.

In order to assure that the commands from different programs may utilize a single FIFO unit 31 in the manner of a cache, the input/output control unit 29 utilizes the pusher circuit 53. The pusher circuit 53 includes a comparator 73 which compares the seven bits of each new command indicating the address area with the seven bits held in the register 42 indicating the application program presently using the FIFO unit 31. If these bits differ from those in the register 42 and there are commands in the FIFO unit 31, the pusher circuit 53 issues a hold command on the bus 27 to stop additional commands being sent from the new application program. During the holdoff period, the FIFO unit 31 may empty all of the commands of the old application program. If the puller circuit 40 has completed emptying the FIFO unit 31 so the FIFO unit 31 is empty of commands when a command from a new application arrives, the new application is detected; and each of the registers of the table 36 is set to the special value zero so that a new device address and new instance value must be placed in a register and context placed on any input/output device before a command can be transferred to it.

However, when the bus holdoff expires, commands from the old program may still be in the FIFO unit 31; and the new commands may have to be placed in local memory on the input/output control unit 29. In one embodiment, the local memory used for this purpose is an off-screen portion of the memory in the frame buffer utilized by the graphics controller 33.

In one embodiment of the invention, a register 45 is included as a part of the input/output control unit 29. The register 45 stores an indication of the number of available entries in the FIFO unit 31. The use of this register 45 allows a requirement to be placed on an application program attempting an access of the input/output control unit 29 that it first determine whether space is available in the FIFO unit 31. It also allows an application presently using the resources of the input/output control unit 29 to proceed without overflowing the FIFO unit 31. The application program may obtain a boundary value indicating the number of free entries in the FIFO unit by reading from a designated offset in any of the sub-areas of its mapped area. The application may write up to the amount of data designated by this boundary value without further testing and be certain that overflow of the FIFO unit will not occur. It should be noted that this read operation is the only read necessary in dealing with the input/output control unit 29.

If the pusher circuit 53 has generated a holdoff command to the bus 27 in order to stop the flow of write commands when a new program attempts to utilize the FIFO unit 31 and after the holdoff period has expired the FIFO buffer is still not empty as determined by logic 72, the pusher 53 sets the value in the register 45 to zero and transfers each of the next commands received on the bus 27 to runout memory associated with the input/output control unit 29, recording the area bits, address, and data of each command as it is stored. The pusher then interrupts the resource manager which waits for the puller circuit 40 to complete processing the commands remaining in the FIFO buffer. When the puller circuit 40 has completed emptying the FIFO unit 31, the resource manager takes over the operation of processing the commands in runout memory.

The resource manager takes over each of the functions of the puller 53 in so far as the transferring of commands to the various portions of the input/output control unit 29 are concerned until any runout memory storing commands originally directed to that FIFO unit 31 has been emptied. The resource manager must execute the commands in sequence in order for the operations to be executed correctly. For this reason, a runout register 78 and comparator 75 are provided so that all commands addressed to the overflowing FIFO unit 31 after a first command is sent to the runout area are also sent to the runout area. The value in the register 45 is held at zero until all of the data in the runout area have been cleared.

The first command from the new application program attempting to write to an input/output device must be an offset zero write with the virtual name of a device to make an input/output object which has been created accessible in one of the sub-areas or to create an object if it does not yet exist. When the command ultimately arrives at the bottom of the FIFO unit 31, the virtual name of the device that corresponds to the object is concatenated with the seven highest bits in the register 52 indicating the application area and looked up in the translation table 38 to determine the physical address on the device bus 34 for that object. If the translation exists in the translation table 38, the physical address on the bus 34 is placed in the current physical address table 36 and the context on the device is changed. The physical address on the bus may then be concatenated with the eleven bits of the method designated in later commands which will cause immediate transfer of the command on the bus 34 to the device. If no translation exists in the translation table 38 but an object has already been created, the input/output control unit 29 generates an interrupt to the resource manager. (If the object has not yet been created, the creation takes place in the manner described at length above.) For an existing object, the resource manager receives the interrupt and recognizes that this is a call for a new input/output resource to be made accessible in that sub-area. It places the translation for a physical device in the translation table and changes any context which need to be changed to service the new application. Then it returns the operation to the input/output control unit 29. The input/output control unit 29 executes the command by placing the physical address in the physical address table.

A similar process takes place when the reference to the translation table results in an indication that there is no translation in the translation table for the name, perhaps because the input/output object is a software object. An interrupt is generated which transfers the operation to the resource manager. The resource manager reads the name from the input/output control unit and performs the lookup. It discovers that the named object is to be implemented by software and places an indication in the table 36 that the resource manager is to be called. If there is no translation for the object because the corresponding physical device does not exist as a part of the input/output control unit, it must be executed by the resource manager. In the case of a hardware input/output device which does not perform a little used operation in hardware, the hardware translation is actually placed in the translation table 38 and the current physical address register 36. The command is transferred to the input/output device which discovers that the command is to non-existent hardware, and interrupts the resource manager. The resource manager emulates the requested operation, possibly using devices other than those on the device bus 34.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An input/output control unit adapted to be joined between a system I/O bus and an input/output device in a multitasking computer system comprising:

a storage circuit having a system input/output address and holding a context value for the input/output device to function with an application program, the storage circuit responding to commands from an application program addressed to the system input/output address of the storage circuit to provide a context value for the commands to the input/output device, and a translating circuit holding context values for the input/output device to function with application programs, and a loading circuit responsive to commands from an application program to the system input/output address of the storage circuit to store in the storage circuit a context value from the translating circuit for the input/output device to function with an application program.

2. An input/output control unit as claimed in claim 1 in which a storage circuit responds to commands addressed to the system input/output address of the storage circuit to provide the context value for the commands to the input/output device whenever the loading circuit stores a new context in the storage circuit.

3. An input/output control unit adapted to be joined to an input/output device in a multitasking computer system comprising:

a plurality of storage circuits each having a system input/output address and holding a context value for the input/output device to function with an application program, each storage circuit responding to commands addressed to the system input/output address of the storage circuit to provide the context value for the commands to the input/output device, a translating circuit holding context values for the input/output device to function with application programs, and a loading circuit responsive to commands to system addresses of the storage circuits to store in one of the storage circuits a context value for the input/output device to function with an application program.

4. An input/output control unit as claimed in claim 3 in which a storage circuit responds to commands addressed to the system input/output address of the storage circuit to provide the context value for the commands to the input/output device whenever a new storage circuit is addressed.

5. An input/output control unit as claimed in claim 3 in which a context value is selected in the translating circuit using an index value which includes an application indicator and an input/output device indicator.

6. An input/output control unit as claimed in claim 5 in which a context value is transferred to the addressed input/output device whenever a new application indicator is used in the index value.

7. An input/output control unit
adapted to be joined to an input/output device in a multitasking computer system comprising:

a storage circuit having a system input/output address and holding a context value for the input/output device to function with an application program, the storage circuit responding to commands addressed to the system input/output address of the storage circuit to provide a context value for the commands to the input/output device, a translating circuit holding context values for the input/output device to function with application programs;

a loading circuit responsive to commands to the system input/output address of the storage circuit to store in the storage circuit a context value from the translating circuit for the input/output device to function with an application program; and means for providing new context values to the translating circuit including:

means for generating new context values in response to commands, and means for storing context values generated in the translating circuit when an attempt to address an input/output device using the index for a context value fails.

8. An input/output control unit
adapted to be joined to an input/output device in a multitasking computer system comprising:

a storage circuit having a system input/output address and holding a context value for the input/output device to function with an application program, the storage circuit responding to commands addressed to the system input/output address of the storage circuit to provide a context value for the commands to the input/output device, a translating circuit holding context values for the input/output device to function with application programs;

a loading circuit responsive to commands to the system input/output address of the storage circuit to store in the storage circuit a context value from the translating circuit for the input/output device to function with an application program; and means responding to an absence of a context value in the storage circuit for changing context on an input/output device, and in which the loading circuitry comprises means for clearing context values from the storage circuit when a new application addresses an input/output device.

9. An input/output control unit
adapted to be joined to an input/output device in a multitasking computer system comprising:

a storage circuit having a system input/output address and holding a context value for the input/output device to function with an application program, the storage circuit responding to commands addressed to the system input/output address of the storage circuit to provide a context value for the commands to the input/output device, a translating circuit holding context values for the input/output device to function with application programs;

a loading circuit responsive to commands to the system input/output address of the storage circuit to store in the storage circuit a context value from the translating circuit for the input/output device to function with an application program;

means responding to an absence of a context value in the storage circuit for changing context on an addressed input/output device, and in which the loading circuitry comprises means for clearing a context value from the storage circuit for an application program and a particular input/output device.

10. An input/output control unit as claimed in claim 7 which further comprises a database of context values for particular input/output devices.

11. An input/output control unit as claimed in claim 5 further comprising an input/output device including:

means for storing a context value, means for storing an application indicator, and means for comparing a stored context value and application indicator to a new context value and application indicator, and means for changing context on the input/output device when a comparison indicates that a stored context value and application indicator to a new context value and application indicator differ.

12. An input/output control unit as claimed in claim 11 in which the input/output device includes circuitry for changing context.

13. An input/output control unit as claimed in claim 12 in which the input/output device interrupts an operating system for changing context.

14. An input/output control unit adapted to be joined to an input/output device in a multitasking computer system comprising:

a storage circuit having a system input/output address and holding a context value for the input/output device to function with an application program, the storage circuit responding to commands addressed to the system input/output address of the storage circuit to provide a context value for the commands to the input/output device, a translating circuit holding context values for the input/output device to function with application programs;

a loading circuit responsive to commands to the system input/output address of the storage circuit to store in the storage circuit a context value from the translating circuit for the input/output device to function with an application program;

the loading circuit comprising:

circuitry responsive to a command addressed to an input/output device for assuring that the input/output device has the correct context before an address translation is furnished.

15. A method of providing context for an input/output device in a multitasking computer system in which commands appear on a system input/output bus comprising:

storing an instance value for the input/output device to function with an application program in a translation circuit positioned between the system input/output bus and at least one input/output device, placing the instance value stored in the translation circuit in a storage circuit positioned between the system input/output bus and at least one input/output device in response to commands from an application program naming the addressed input/output device, sending the instance value from the storage circuit to the input/output device in response to a commands from an application program directed to a system input/output bus address, and setting context at the device in response to the instance value.

16. A method of providing context for an input/output device as claimed in claim 15 in which the step of setting context at the device in response to the instance value comprises selecting context from one of N sets of context registers on the input/output device.

17. A method of providing context for an input/output device as claimed in claim 15 in which the step of setting context at the device in response to the instance value comprises selecting context for a set of context registers on the input/output device from one of N sets of context stored in local memory.

18. A method of providing context for an input/output device as claimed in claim 15 in which the step of setting context at the device in response to the instance value comprises interrupting an operating system process to store context on the input/output device.

* * * * *